(12) United States Patent
Van Der Sloot et al.

(10) Patent No.: US 11,490,493 B2
(45) Date of Patent: Nov. 1, 2022

(54) DYNAMIC USER INTERFACE

(71) Applicant: SIGNIFY HOLDING B.V., Eindhoven (NL)

(72) Inventors: Roelf Melis Van Der Sloot, Eindhoven (NL); Rob Franciscus Maria Van Elmpt, Roermond (NL); Marcellinus Petrus Carolus Michael Krun, Eindhoven (NL); Judith Hendrika Maria De Vries, Budel-Schoot (NL)

(73) Assignee: SIGNIFY HOLDING B.V., Eindhoven (NL)

( * ) Notice: Subject to any disclaimer, the term of this patent is extended or adjusted under 35 U.S.C. 154(b) by 0 days.

(21) Appl. No.: 17/422,505

(22) PCT Filed: Jan. 17, 2020

(86) PCT No.: PCT/EP2020/051164
§ 371 (c)(1),
(2) Date: Jul. 13, 2021

(87) PCT Pub. No.: WO2020/152058
PCT Pub. Date: Jul. 30, 2020

(65) Prior Publication Data
US 2022/0095440 A1    Mar. 24, 2022

(30) Foreign Application Priority Data

Jan. 21, 2019 (EP) ...................................... 19152918

(51) Int. Cl.
*H05B 45/20* (2020.01)
*H05B 47/175* (2020.01)
(Continued)

(52) U.S. Cl.
CPC ....... *H05B 47/175* (2020.01); *G06F 3/04847* (2013.01); *H05B 45/20* (2020.01); *H05B 47/105* (2020.01)

(58) Field of Classification Search
CPC ...... H05B 45/20; H05B 47/10; H05B 47/105; H05B 47/175; G06F 3/04847
See application file for complete search history.

(56) References Cited

U.S. PATENT DOCUMENTS

| 7,242,152 | B2 * | 7/2007 | Dowling | .............. H05B 47/155 |
| | | | | 315/312 |
| 7,385,359 | B2 * | 6/2008 | Dowling | ................... F21K 9/00 |
| | | | | 362/372 |

(Continued)

FOREIGN PATENT DOCUMENTS

WO     2017009027 A1    1/2017

*Primary Examiner* — Haissa Philogene (57) ABSTRACT

The invention provides a user interface for controlling a multichannel lighting unit wherein each channel of the multichannel lighting unit comprises at least one light source for emitting light having a channel-specific spectral composition, the spectral composition associated with one channel being different from the spectral composition associated with another channel, and a light output from each channel being individually controllable, the user interface comprising at least two user interaction elements, each user interaction element associated with a color producible with the multichannel lighting, each user interaction element comprising: (a) a static scale representing a static range of control values for controlling a light output of the multichannel lighting unit in respect of the color associated with the user interaction element; (b) a dynamic scale representing a dynamic range of control values for controlling a light output of the multichannel lighting unit in respect of the color associated with the user interaction element, wherein the dynamic range of control values is a valid/executable (Continued)

range determined at least in part based on a present control value selected in respect of another user interaction element, and; (c) a selector adjustable by a user of the user interface for selecting a present control value for controlling the light output of the multichannel lighting unit in respect of the color associated with the user interaction element.

15 Claims, 7 Drawing Sheets

(51) Int. Cl.
*H05B 47/105* (2020.01)
*G06F 3/04847* (2022.01)

(56) References Cited

U.S. PATENT DOCUMENTS

| | | | |
|---|---|---|---|
| 2004/0160199 A1* | 8/2004 | Morgan | G09G 3/14 |
| | | | 315/312 |
| 2005/0275626 A1* | 12/2005 | Mueller | H05B 47/19 |
| | | | 345/156 |
| 2011/0127930 A1 | 6/2011 | Bennette | |
| 2016/0259540 A1 | 9/2016 | Hole | |
| 2016/0371830 A1 | 12/2016 | Barrasso et al. | |
| 2017/0263034 A1* | 9/2017 | Kenoff | G06F 30/13 |
| 2019/0098723 A1* | 3/2019 | Sadwick | F21K 9/272 |

* cited by examiner

DYNAMIC USER INTERFACE

CROSS-REFERENCE TO PRIOR APPLICATIONS

This application is the U.S. National Phase application under 35 U.S.C. § 371 of International Application No. PCT/EP2020/051164, filed on Jan. 17, 2020, which claims the benefit of European Patent Application No. 19152918.9, filed on Jan. 21, 2019. These applications are hereby incorporated by reference herein.

FIELD OF THE INVENTION

The invention relates to a user interface for lighting systems and lighting system comprising such user interface. The invention further relates to a method of interaction with a user in setting lighting properties for light generated by a lighting system as well as to a computer program product for executing such method. The invention particularly relates to a user interface, system, method and computer program product providing a dynamic min-max range of available lighting property values when controlling the light generated by a lighting system.

The invention is particularly suitable in the field of agriculture, including areas as horticulture, aquaculture and livestock growth.

BACKGROUND OF THE INVENTION

C2 Development, Inc. (http://www.aquaillumination.com) discloses a multichannel lighting system for aquarium lighting wherein different channels are used to control different LEDs of a lighting unit. Typically, each channel is associated with a particular type of LED, e.g. LEDs having a particular spectral light output, and an end-user of the aquarium lighting system can control each channel individually and therewith control the light output of the associated LEDs between zero and maximum power output. The maximum power output per channel is fixed and determined by the specifications of a driver for the LEDs of the lighting unit. C2 Development, Inc. recently introduced a 'HD' series of products wherein the power per channel is no longer limited to a fixed amount but dynamically adjusted by borrowing power from channels not utilized.

US 2016/259540 A1 discloses an active color interface including a first fader, where the first fader includes a first selector and a first range of selections. The active color interface can also include a second fader, where the second fader includes a second selector and a second range of selections. The first range of selections can be altered when the second selector moves among the second range of selections. The second range of selections can be altered when the first selector moves among the first range of selections. A light source of a lighting device can emit an overall color that corresponds to a first selection among the first range of selections by the first selector and a second selection among the second range of selections by the second selector.

WO2017/009027 A1 discloses a configurable controller for a lighting arrangement or assembly adapted to control or change an output characteristic of the lighting arrangement in response to a user input received at a user interface. The configurable controller limits the amount to which a user input at the user interface may adjust the output characteristics by storing a range of selectable or presently available values for the output characteristic. This range of selectable values is adjustable based upon a configuration input received from a remote device at a communication unit.

US 2011/127930 A1 describes systems, interfaces, and methods for controlling a luminaire. The luminaire includes a plurality of light sources or emitters corresponding to different characteristics of light. Color controls corresponding to pre-defined characteristics are set or modified by one or more dials, faders, or similar interface devices. Each of the color controls correspondingly controls the output of one or more of the light sources. A separation between the preset characteristic for each color control and the actual characteristic of each light source is calculated. An output value for each light source that is required to generate the selected characteristic is then calculated and stored in memory. When one or more color controls are selected, the output values of each light source required to reproduce the desired characteristic is determined, and the light sources in the luminaire are driven at the corresponding output values.

SUMMARY OF THE INVENTION

The spectral light output of LEDs (also referred to as spectral power distribution SPD) typically does not consist of a single wavelength but comprises a number of wavelengths. For example, a red LED may not only emit red light but also emit some light in the deep-red wavelength range. Adjusting the light output of the red channel in a multichannel lighting unit may therefore also influence the light output in the deep-red wavelength range. Similarly, a white LED typically emits light in the blue, green and red wavelength range. Adjusting the green light output of the multichannel lighting unit by means of the white channel in the multichannel lighting unit may therefore also influence the light output in the blue wavelength range. In applications where the light output, in particular the spectral power distribution of the light output, of a multichannel lighting unit needs to be accurately controlled, such as in horticulture growth of plants, it is mandatory for an operator of such horticulture growth facility to be informed of the effect of an adjustment in one channel of a multichannel lighting unit on the overall light output of the multichannel lighting unit and potentially on the light output from other channels.

Therefore, described herein are a user interface, system, method and computer program product for operating a multichannel lighting unit wherein an operator of the multichannel lighting units is informed of changes in a spectral power distribution of a light output of the multichannel lighting unit as a result of a change in a setting of one channel of the multichannel lighting unit.

The present description will focus, by means of example, on multichannel lighting units for use in horticulture although the inventive concepts described herein are also applicable to multichannel lighting units for use in aquaculture (fish farming, aquarium lighting, algae cultivation etc.), livestock farming (poultry stables, swineries etc.) and other application where multichannel lighting units are used for creating a specific lighting environment.

Plants use the process of photosynthesis to convert light, $CO_2$ and $H_2O$ into carbohydrates (sugars). These sugars are used to fuel metabolic processes. The excess of sugars is used for biomass formation. This biomass formation includes stem elongation, increase of leaf area, flowering, fruit formation, etc. The photoreceptor responsible for photosynthesis is chlorophyll. Apart from photosynthesis, also photoperiodism, phototropism and photomorphogenesis are representative processes related to interaction between radiation and plants:

photoperiodism refers to the ability that plants have to sense and measure the periodicity of radiation (e.g. to induce flowering), phototropism refers to the growth movement of the plant towards and away from the radiation, and photomorphogenesis refers to the change in form in response to the quality and quantity of radiation.

Two important absorption peaks of chlorophyll a and b are located in the red and blue regions, especially from 625-675 nm and from 425-475 nm, respectively. Additionally, there are also other localized peaks at near-UV (300-400 nm) and in the far-red region (700-800 nm). The main photosynthetic activity seems to take place within the wavelength range 400-700 nm. Radiation within this range is called photosynthetically active radiation (PAR).

In the context of horticulture lighting, near-UV is defined as one or more wavelengths selected from the spectral range of 300-400 nm, blue is defined as one or more wavelengths selected from the spectral range of 400-500 nm, white is defined is defined as wavelengths selected from the spectral range of 400-700 nm (which selected wavelengths together may constitute white light, such as a combination of wavelengths in the blue and green and red), green is defined as one or more wavelengths selected from the spectral range of 500-600 nm, red is defined as one or more wavelengths selected from the spectral range of 600-700 nm, deep-red is defined as one or more wavelengths selected from the spectral range of 640-700 nm, and far-red is defined as one or more wavelengths selected from the spectral range of 700-800 nm. Deep-red is thus a sub selection of red.

Other photo sensitive processes in plants include phytochromes. Phytochrome activity steers different responses such as leaf expansion, neighbor perception, shade avoidance, stem elongation, seed germination and flowering induction. The phytochrome photo system includes two forms of phytochromes, Pr and Pfr, which have their sensitivity peaks in the red at 660 nm and in the far-red at 730 nm, respectively.

In horticulture, the light output of a light source is often expressed as a radiant flux in terms of number of photons per second (in $\mu mol/s$ or $\mu mol \cdot s^{-1}$; a mol corresponding to $6 \cdot 10^{23}$ photons) emitted by the light source. When the light source is installed in a horticulture facility, the light output can be calibrated as an amount of light received on a surface, e.g. a tray with plants, and then the light output of the light source is often expressed as an irradiance or radiant flux density in term of number of photons per second per unit of area ($\mu mol/s/m^2$ or $\mu mol \cdot s^{-1} \cdot m^{-2}$). In the case of photosynthetically active radiation (PAR) one refers to a photosynthetic photon flux or a photosynthetic photon flux density (PPFD) measured in number of photons in the wavelength range 400 nm-700 nm per second ($\mu mol/s$ or $\mu mol \cdot s^{-1}$) or number of photons in the wavelength range 400 nm-700 nm per second per unit of area ($\mu mol/s/m^2$ or $\mu mol \cdot s^{-1} \cdot m^{-2}$), respectively. The PPFD can be determined from a photodiode or measured directly with a photomultiplier. The reference area in the PPFD definition is the receiving (plant) area of the space wherein the light source(s) are arranged. In case of a multi-layer system, it may be defined as the area of a relevant layer comprised in the multi-layer configuration; the PPFD may then be estimated in relation to each layer individually (see further also below).

In this description, the terms "luminous" and "radiant", such as in luminous/radiant power indicating the energy per unit time, and the terms "illuminance" and "irradiance", indicating the energy per unit time incident on a surface per unit area, are used interchangeably. In general, illumination refers to emission of energy in the wavelength range of visible light (coinciding with the PAR range) and radiation refers to emission of energy in a wavelength range broader than but including visible light. In the context of this description, radiation may for example include, next to wavelengths in the blue and red spectrum, also wavelengths in the UV spectrum and/or wavelengths in the far-red or infrared spectrum.

Plant growth depends not only on the amount of light but also on spectral composition (SPD), duration, and timing of the light on the plant. A combination of parameter values in terms of these aspects is called a "light protocol" for growing the plant (herein, the words plant and crop can be interchanged). Different combination of light colors with different intensities in a different time schedule, i.e. different light protocols, can results in different response of plants and crops. Thus, different light protocols can be used to induce different responses in plants and crops, e.g. boost crop growth, increase shelf life, adjust vitamin or mineral content in crops, change the color of leaves, etc.

LEDs can play a variety of roles in horticultural lighting such as:

Supplemental lighting: lighting that supplements the natural daylight is used in order to increase production (of tomatoes for example) or extend crop production during e.g. the autumn, winter, and spring period when crop prices may be higher.

Photoperiodic lighting: The daily duration of light is important for many plants. The ratio of the light and dark period in a 24 hour cycle influences the blossoming response of many plants. Manipulating this ratio by means of supplemental lighting enables regulating the time of blossoming.

Cultivation without daylight in plant factories.

Tissue culture.

In circumstances that plants get insufficient light from natural sunlight, e.g. in greenhouses in northern regions or in so-called "plant farming" or "vertical farming" that fully rely on artificial and well controlled conditions, there appears to be a need to provide supplemental light to the plant for growing (leaf and fruit), ripening and pre-harvest conditioning.

Light is not the only enabler for growth; the atmosphere (humidity level, temperature, $CO_2/O_2$ levels, etc.), water supply, nutrients and spore elements are of also importance for growth. Control of these parameters, including cyclic variations/profiles in these parameter settings such a day/night settings, is often included in a "growth protocol" or "cultivation protocol".

The space available for food production is becoming scarcer. Innovation in production methods is needed to deliver higher yields from smaller footprints, while becoming more sustainable (minimum use of energy and water). Producing food in closed environments such as plant factories is a method to meet these demands. In plant factories (also known as city farms or vertical farms), food is grown in multiple layers, making much better use of the available space as compared to outdoor growth or growth in greenhouses. This implies that daylight will not be able to reach all plants and nearly all the light has to come from artificial lighting. In plant factories, there is a need for providing to the plants a light treatment that is optimal at all times. At the same time, it is imperative that the light that is generated by the LED lighting units is used as efficiently as possible in order to reduce energy consumption and result in a profitable business. In plant factories, the production per unit of area is much higher than the production in the open field. The use of water is minimized. Plant diseases and pests can be prevented more easily.

In horticulture, relatively much light, and thus energy, is used. Providing the optimal amount of light in terms of $\mu mol \cdot s^{-1} \cdot m^{-2}$ of a specific wavelength to grow plants is the key for the future of horticulture.

The term "horticulture" relates to (intensive) crop or plant cultivation for human use and is very diverse in its activities, incorporating plants for food (fruits, vegetables, mushrooms, culinary herbs) and non-food crops (flowers, trees and shrubs, turf-grass, hops, grapes, medicinal herbs). Horticulture is the branch of agriculture that deals with the art, science, technology, and business of growing plants. It may include the cultivation of medicinal plants, fruits, vegetables, nuts, seeds, herbs, sprouts, mushrooms, algae, flowers, seaweeds and non-food crops such as grass and ornamental trees and plants. Here, the term "plant" is used to refer essentially any species selected from medicinal plants, vegetables, herbs, sprouts, mushrooms, plants bearing nuts, plants bearing seeds, plants bearing flowers, plants bearing fruits, non-food crops such as grass and ornamental trees, etc. The term "plant part" may refer to root, stem, leaf, fruit (if any), etc. of a plant.

The term "livestock" relates to domesticated animals raised in an agricultural setting to produce labor and commodities such as meat, eggs, milk, fur, leather, and wool. The term is sometimes used to refer solely to those that are bred for consumption, while other times it refers only to farmed ruminants, such as cattle and goats.

The term "crop" is used herein refers to a plant or animal product that can be grown and harvested extensively for profit or subsistence. Crop may refer either to the harvested parts or to the harvest in a more refined state. Most crops are cultivated in agriculture or aquaculture. A crop is usually expanded to include macroscopic fungus (e.g. mushrooms), or alga (algaculture). Most crops are harvested as food for humans or fodder for livestock. Some crops are gathered from the wild (including intensive gathering, e.g. ginseng). Important non-food crops include horticulture, floriculture and industrial crops. Horticulture crops include plants used for other crops (e.g. fruit trees). Floriculture crops include bedding plants, houseplants, flowering garden and pot plants, cut cultivated greens, and cut flowers. Industrial crops are produced for clothing (fiber crops), biofuel (energy crops, algae fuel), or medicine (medicinal plants).

As described above, a light protocol is created by mixing different colors of light, at different light intensities, for a particular time period. Execution of the light protocol by a multichannel lighting unit is done by selectively powering LEDs of the lighting unit, wherein the LEDs have different spectral power distributions. In a multichannel lighting unit, LEDs having the same spectral power distribution are typically assigned or allocated to the same channel and LEDs having a different spectral power distribution are typically assigned or allocated to a different channel.

LEDs may have different but overlapping spectral power distributions. For example, the spectral power distribution of a red LED may overlap with the spectral power distribution of a far-red LED. Or, the spectral power distribution of a white LED may overlap with the spectral power distribution of a blue and/or red LED. One type of LED may have a spectral power distribution comprising multiple colors of interest for the use case (e.g. horticulture growth of a particular crop) at hand and the light protocol for that use case.

Operators of lighting systems are generally not aware of the details of the spectral power distribution of the LEDs incorporated in the lighting system. Operators are, in the first place, interested in the type of color(s) and the relative/absolute amount of each color in the overall light output of the lighting system. Their interest is to achieve a certain effect from the light output (e.g. a certain plant reaction such as photosynthesis, leaf growth, stem growth etc.).

The inventors have realized that to realize a light protocol with a lighting system, i.e. mixing colors of light with a specific light intensity per light color, the following technicalities of the lighting system are important: (1) what is the combination of LED-chips used in the lighting units of the lighting system; (2) what is the maximum power that each lighting unit can handle, and; (3) which colors are being radiated by the various LED-chips (including multi-color radiation from a single LED-chip). The combination of the technicalities listed above makes it difficult to create a desired or valid light setting. For example, if one turns on the 'white' LED-chip, automatically this will have an impact on the i.a. the blue, green, red and possibly also the far-red color in the light recipe. As another example, if one maximizes the light output for the blue and green color in a light setting, then power limitations may result in not being able to provide absolute maximum light output for the red and/or far-red color anymore.

The invention is based on the idea of providing a dynamic light output range taking into account the technicalities listed above, e.g. the interactions between colors and power limitations, and guide an operators, lighting designer or light protocol developer through the process in defining a valid specific mix of light colors with a specific light intensity executable with the (multichannel) lighting unit(s) of a lighting system. Such dynamic light output range provides a range of control values for light output of a particular color between a minimum executable light output and a maximum executable light output, i.a. based on the actual light output settings for other colors. The dynamic light output range may be presented in addition to an static light output range providing a range of control values for light output of that same particular color between an absolute minimum and absolute maximum light output as determined by the specifications of the lighting unit or lighting system itself and not taking into account actual light output settings of other colors. Phrased differently, the static light output range may regarded as a 'design range', as it is determined by design of the lighting unit/lighting system, whereas the dynamic light output range may be regarded as an 'operational range'. Per adjustment made in a light setting or light protocol, the dynamic ranges for all the light colors adjust themselves, where the static ranges are fixed and remain the same.

Described herein is a user interface for controlling a multichannel lighting unit wherein each channel of the multichannel lighting unit comprises at least one light source for emitting light having a channel-specific spectral composition, the spectral composition associated with one channel being different from the spectral composition associated with another channel, a light output from each channel being individually controllable, the user interface comprising:
 at least two user interaction elements, each user interaction element associated with a color producible with the multichannel lighting, each user interaction element comprising:
  a static scale representing a static range of control values for controlling a light output of the multichannel lighting unit in respect of the color associated with the user interaction element, wherein the range of control values in the static scale is determined by a minimum and maximum light output, in the associated color, of the multichannel lighting unit, a dynamic scale representing a dynamic range of control values for controlling a light output of the multichannel lighting unit in respect of the color associated with the user interaction element, wherein the dynamic range of control values is a valid/executable range determined at least in part based on a present control value selected in respect of another user interaction element, a selector adjustable by a user of the user interface for selecting a present control value for controlling the light output of the multichannel lighting unit in respect of the color associated with the user interaction element.

The color associated with a user interaction elements does not necessarily directly associate with or relate to a channel of the multichannel lighting unit. Examples include a green color that is not directly associated with a green channel of the multichannel lighting unit but is indirectly linked to the white channel because the white channel will also provide green light emission, or a far-red color that is not directly associated with a far-red channel of the multichannel lighting unit but is indirectly linked to the red channel which also provides some far-red light emission. Therefore, in an embodiment, the color associated with at least one of the at least two user interaction elements does not have a directly corresponding channel in the multichannel lighting unit.

The dynamic range of a first of the at least two user interaction elements may be automatically adapted when the present control value for a second of the at least two user interaction elements is changed using the selector of the second of the at least two user interaction elements. A valid/executable range of control values for a particular user interaction element is determined based (1) technical characteristics of the multichannel lighting unit such the number and spectral composition of the different channels of the multichannel lighting unit and maximum power consumption of the lighting unit, and (2) operational characteristics of the multichannel lighting unit such as selected control values for other user interaction elements.

Control values may include luminous/radiant power or luminous/radiant flux, luminous/radiant intensity, illuminance/irradiance or any other value representing an amount of light/radiation.

In general, the dynamic range of a user interaction elements will be a subrange of the static range of that user interaction elements. In embodiments, the dynamic range excludes the end points of the static range, more specifically a minimum control value of the dynamic range of a user interaction element is larger than a minimum control value of the static range for that user interaction element.

In embodiment, at least two of the static scale, the dynamic scale and the selector of a user interaction element overlay each other. In particular the selector may overlay the dynamic scale, which itself overlays the static scale. Some or all of the static scale, dynamic scale and selector may be semitransparent such that they maintain visible to the user or operator of the user interface even when overlaid.

The user interface may further comprise feedback indicators, wherein each feedback indicator is associated with a user interaction element for indicating the present control value for controlling the light output of the multichannel lighting unit in respect of the color associated with the user interaction element.

The control values in the static range, the dynamic range and/or the feedback indicator may be expressed as a percentage or an absolute value. In particular, the control value for a particular user interaction element may be expressed in $\mu mol \cdot s^{-1}$ or $\mu mol \cdot s^{-1} \cdot m^{-2}$ of photon in the wavelength range of the corresponding color, which is especially advantages in horticulture applications where the visual color perception is of less important but the number of emitted photons by the multichannel lighting unit and/or the number of received photons by the plants of a particular wavelength or wavelength range triggering a biological process in the plants is important. Therefore, in an advantageous embodiment, the multichannel lighting unit is a horticulture lighting unit for growing plants or crops.

The user interface may comprise a plurality of user interaction elements for controlling a plurality of colors capable of being emitted by the multichannel lighting units. These colors may include visible colors such as blue, green, white, red and/or deep-red. Optionally these colors may include non-visible colors such as far-red, UV, infra-red etc.

Also described herein is a method of controlling a multichannel lighting unit wherein each channel of the multichannel lighting unit comprises at least one light source for emitting light having a channel-specific spectral composition, the spectral composition associated with one channel being different from the spectral composition associated with another channel, a light output from each channel being individually controllable, the method comprising:

providing at least two user interaction elements, each user interaction element associated with a color producible with the multichannel lighting, each user interaction element comprising:

a static scale representing a static range of control values for controlling a light output of the multichannel lighting unit in respect of the color associated with the user interaction element, wherein the range of control values in the static scale is determined by a minimum and maximum light output, in the associated color, of the multichannel lighting unit, a dynamic scale representing a dynamic range of control values for controlling a light output of the multichannel lighting unit in respect of the color associated with the user interaction element, wherein the dynamic range of control values is a valid/executable range determined at least in part based on a present control value selected in respect of another user interaction element, a selector adjustable by a user of the user interface for selecting a present control value for controlling the light output of the multichannel lighting unit in respect of the color associated with the user interaction element;

selecting, using the selector of a first of the at least two user interaction elements, a present control value for controlling the light output of the one user interaction element; and adapting the dynamic scale of a second of the at least two user interaction elements, based on the present control value selected in respect of the first user interaction element.

The step of adapting may comprise adapting the dynamic range of the second of the at least two user interaction elements to be a subset of the static range of the second of the at least two user interaction elements, wherein a minimum control value of the dynamic range is larger than the minimum control value of the static range for the second of the at least two user interaction elements.

This disclosure also provides a lighting system comprising:
- a multichannel lighting unit wherein each channel of the multichannel lighting unit comprises at least one light source for emitting light having a channel-specific spectral composition, the spectral composition associated with one channel being different from the spectral composition associated with another channel, and a light output from each channel being individually controllable;
- a controller for controlling the light output of each channel of the multichannel lighting unit, based on a control value for said channel;
- a user interface as described above for selecting the control value for said channel; and
- a network for functionally connecting the user interface, the controller and the multichannel lighting unit.

The network may be any suitable network known in the art for connecting the multichannel lighting unit, the controller and the user interface in a control system. These networks may be wired or wireless communication networks and may use any suitable communication protocol such as Zigbee, DMX, powerline communication or coded mains, etc.

The user interface may be implemented a software module running a processor which is operatively coupled with a display, such as a monitor, and a user input device, such as a keyboard or mouse, for interacting with the user and/or operator of the lighting system. The display and user input devices may be combined in a single device such as a laptop, tablet, smartphone, touch sensitive display etc.

The controller may be a computing device adapted to receive input from the user interface device and send information to the user interface device for displaying. The controller may be further adapted to generate control signals for controlling the light output of the multichannel lighting unit.

The lighting system may further comprise a separate driver for electrically driving the light sources of the multichannel lighting unit with individual drive signals, as well known in the art. The driver may be part of the multichannel lighting unit, part of the controller or a separate device functionally in between the controller and the multichannel lighting unit.

The multichannel lighting unit may comprise at least three channels: a first channel for emitting blue light, a second channel for emitting white light and third channel for emitting red, deep-red light or far-red light. The user interface may comprise at least three user interaction elements: a first user interaction element for controlling blue light, a second user interaction element for controlling green light and third user interaction element for controlling red, deep-red light or far-red light.

There is further provided a computer program product, which when running on a processor which is functionally coupled to or comprised by the user interface as described above, is capable of executing the steps of the method as disclosed.

The phrase "light output" and "minimum light output (and maximum light output)" and similar expressions especially refers to the amount of the respective type of light (blue, green, deep red, far red, etc.) in the light output from the multichannel lighting unit. The phrase "power" and "minimum power (and maximum power)" and similar expressions especially refer to the power setting of the respective channel (blue, white, red, etc.) of the multichannel lighting unit. Both quantities may be expressed in a percentage scale (e.g. 0-100%) or an absolute value scale in the units of the respective quantity (e.g. $\mu mol \cdot s^{-1}$ or Watt).

The term "light source" should be understood to refer to any one or more of a variety of radiation sources, including, but not limited to, LED-based sources (including one or more LEDs as defined above.

A given light source may be configured to generate electromagnetic radiation within the visible spectrum, outside the visible spectrum, or a combination of both. Hence, the terms "light" and "radiation" are used interchangeably herein. Additionally, a light source may include as an integral component one or more filters (e.g., color filters), lenses, or other optical components. Also, it should be understood that light sources may be configured for a variety of applications, including, but not limited to, indication, display, and/or illumination. An "illumination source" is a light source that is particularly configured to generate radiation having a sufficient intensity to effectively illuminate an interior or exterior space. In this context, "sufficient intensity" refers to sufficient radiant power in the visible spectrum generated in the space or environment (the unit "lumens" often is employed to represent the total light output from a light source in all directions, in terms of radiant power or "luminous flux") to provide ambient illumination (i.e., light that may be perceived indirectly and that may be, for example, reflected off of one or more of a variety of intervening surfaces before being perceived in whole or in part).

The term "spectrum" should be understood to refer to any one or more frequencies (or wavelengths) of radiation produced by one or more light sources. Accordingly, the term "spectrum" refers to frequencies (or wavelengths) not only in the visible range, but also frequencies (or wavelengths) in the infrared, ultraviolet, and other areas of the overall electromagnetic spectrum. Also, a given spectrum may have a relatively narrow bandwidth (e.g., a FWHM having essentially few frequency or wavelength components) or a relatively wide bandwidth (several frequency or wavelength components having various relative strengths). It should also be appreciated that a given spectrum may be the result of a mixing of two or more other spectra (e.g., mixing radiation respectively emitted from multiple light sources).

For purposes of this disclosure, the term "color" is used interchangeably with the term "spectrum." However, the term "color" generally is used to refer primarily to a property of radiation that is perceivable by an observer (although this usage is not intended to limit the scope of this term). Accordingly, the terms "different colors" implicitly refer to multiple spectra having different wavelength components and/or bandwidths. It also should be appreciated that the term "color" may be used in connection with both white and non-white light.

The term "lighting fixture" or "luminaire" is used interchangeably herein to refer to an implementation or arrangement of one or more lighting units in a particular form factor, assembly, or package. The term "lighting unit" is used herein to refer to an apparatus including one or more light sources of same or different types. A given lighting unit may have any one of a variety of mounting arrangements for the light source(s), enclosure/housing arrangements and shapes, and/or electrical and mechanical connection configurations. Additionally, a given lighting unit optionally may be associated with (e.g., include, be coupled to and/or packaged together with) various other components (e.g., control circuitry) relating to the operation of the light source(s). An "LED-based lighting unit" refers to a lighting unit that includes one or more LED-based light sources as discussed above, alone or in combination with other non LED-based light sources. A "multi-channel" lighting unit refers to an LED-based or non LED-based lighting unit that includes at least two light sources configured to respectively generate different spectrums of radiation, wherein each different source spectrum may be referred to as a "channel" of the multi-channel lighting unit. The term "luminaire" is used herein to refer to a lighting fixture, lamp, or other device into which a lighting unit may be installed. For example, a lighting unit in the form of an LED light bulb may be screwed into a socket of a luminaire such as a desk lamp, hanging lamp or standing lamp. The luminaire may be connected to a power source such as AC mains, and may be configured to, among other things, supply power to an installed lighting unit so that the light unit is capable of emitting light.

The term "controller" is used herein generally to describe various apparatus relating to the operation of one or more light sources. A controller can be implemented in numerous ways (e.g., such as with dedicated hardware) to perform various functions discussed herein. A "processor" is one example of a controller which employs one or more microprocessors that may be programmed using software (e.g., microcode) to perform various functions discussed herein. A controller may be implemented with or without employing a processor, and also may be implemented as a combination of dedicated hardware to perform some functions and a processor (e.g., one or more programmed microprocessors and associated circuitry) to perform other functions. Examples of controller components that may be employed in various embodiments of the present disclosure include, but are not limited to, conventional microprocessors, application specific integrated circuits (ASICs), and field-programmable gate arrays (FPGAs).

In various implementations, a processor or controller may be associated with one or more storage media (generically referred to herein as "memory," e.g., volatile and non-volatile computer memory such as RAM, PROM, EPROM, and EEPROM, floppy disks, compact disks, optical disks, magnetic tape, etc.). In some implementations, the storage media may be encoded with one or more programs that, when executed on one or more processors and/or controllers, perform at least some of the functions discussed herein. Various storage media may be fixed within a processor or controller or may be transportable, such that the one or more programs stored thereon can be loaded into a processor or controller so as to implement various aspects of the present invention discussed herein. The terms "program" or "computer program" are used herein in a generic sense to refer to any type of computer code (e.g., software or microcode) that can be employed to program one or more processors or controllers.

In one network implementation, one or more devices coupled to a network may serve as a controller for one or more other devices coupled to the network (e.g., in a master/slave relationship). In another implementation, a networked environment may include one or more dedicated controllers that are configured to control one or more of the devices coupled to the network. Generally, multiple devices coupled to the network each may have access to data that is present on the communications medium or media; however, a given device may be "addressable" in that it is configured to selectively exchange data with (i.e., receive data from and/or transmit data to) the network, based, for example, on one or more particular identifiers (e.g., "addresses") assigned to it.

The term "network" as used herein refers to any interconnection of two or more devices (including controllers or processors) that facilitates the transport of information (e.g., for device control, data storage, data exchange, etc.) between any two or more devices and/or among multiple devices coupled to the network. As should be readily appreciated, various implementations of networks suitable for interconnecting multiple devices may include any of a variety of network topologies and employ any of a variety of communication protocols. Additionally, in various networks according to the present disclosure, any one connection between two devices may represent a dedicated connection between the two systems, or alternatively a non-dedicated connection. In addition to carrying information intended for the two devices, such a non-dedicated connection may carry information not necessarily intended for either of the two devices (e.g., an open network connection). Furthermore, it should be readily appreciated that various networks of devices as discussed herein may employ one or more wireless, wire/cable, and/or fiber optic links to facilitate information transport throughout the network.

The term "user interface" as used herein refers to an interface between a human user or operator and one or more devices that enables communication between the user and the device(s). Examples of user interfaces that may be employed in various implementations of the present disclosure include, but are not limited to, switches, potentiometers, buttons, dials, sliders, a mouse, keyboard, keypad, various types of game controllers (e.g., joysticks), track balls, display screens, various types of graphical user interfaces (GUIs), touch screens, microphones and other types of sensors that may receive some form of human-generated stimulus and generate a signal in response thereto.

It should be appreciated that all combinations of the foregoing concepts and additional concepts discussed in greater detail below (provided such concepts are not mutually inconsistent) are contemplated as being part of the inventive subject matter disclosed herein. In particular, all combinations of claimed subject matter appearing at the end of this disclosure are contemplated as being part of the inventive subject matter disclosed herein. It should also be appreciated that terminology explicitly employed herein that also may appear in any disclosure incorporated by reference should be accorded a meaning most consistent with the particular concepts disclosed herein.

BRIEF DESCRIPTION OF THE DRAWINGS

Embodiments will now be described, by way of example only, with reference to the accompanying schematic drawings in which corresponding reference symbols indicate corresponding parts, and in which.

DETAILED DESCRIPTION OF THE EMBODIMENTS

Figure 1A:
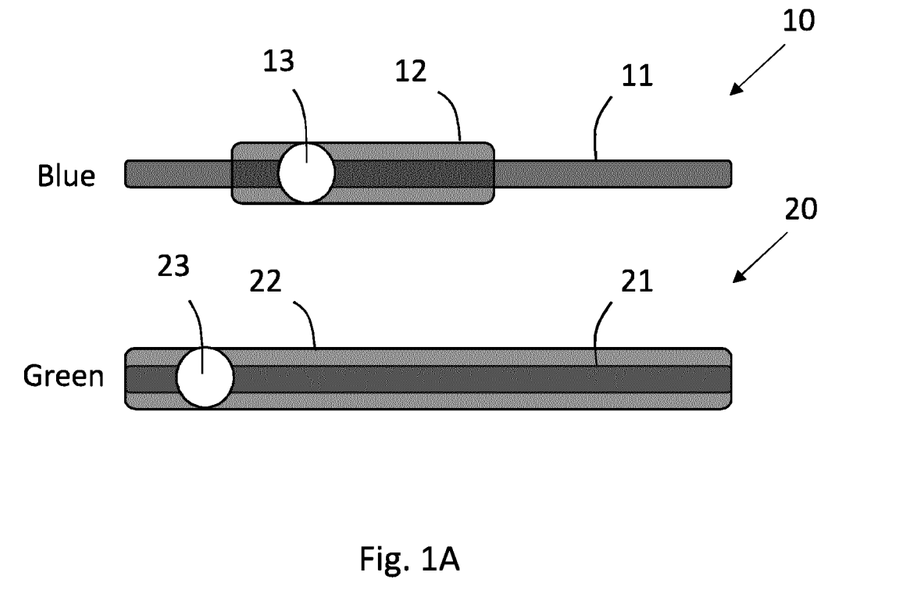
FIGS. 1A and 1B schematically depict a user interface comprising two user interaction elements.
Figure 1B:
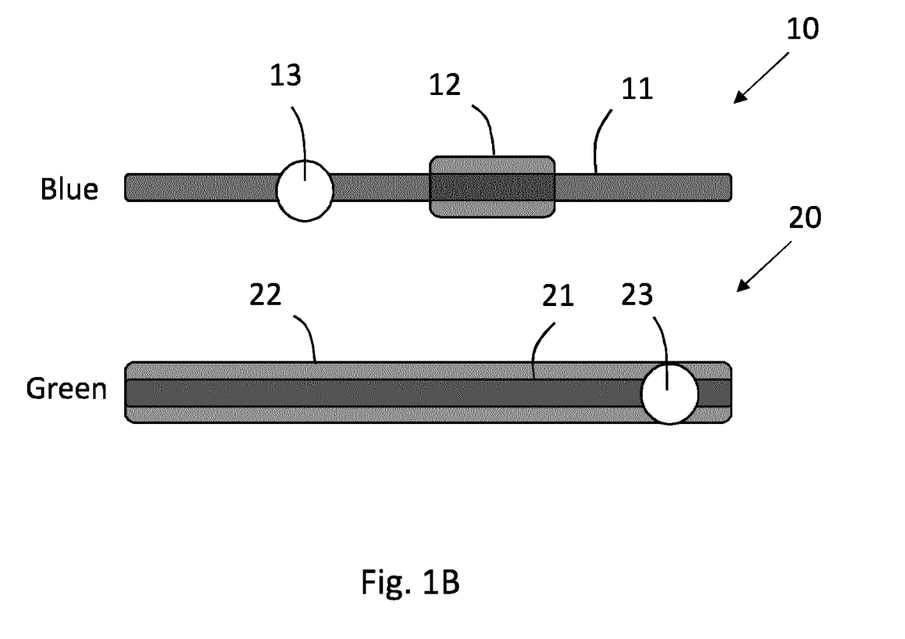

FIGS. 1A and 1B each disclose 2 user interaction elements 10, 20. The user interaction element 10 is associated with the color blue, the user interaction element 20 is associated with the color green. FIGS. 1A and 1B could represent a user interface for controlling the light output of a multichannel lighting unit capable of emitting blue and green light. Such multichannel lighting unit may for example comprise a first channel comprising LEDs emitting in the blue wavelength range and a second channel comprising LEDs emitting white light. White LEDs typically emit light in the blue, green and red wavelength range. Each user interaction element 10, 20 includes a static scale 11, 21 (depicted over the full width of the figure) and a dynamic scale 12, 22 depicted as a subrange (not spanning the full width of the figure) overlaying the static scale 11, 21. A selector 13, 23 overlies the dynamic scale 12, 22 and the static scale 11, 21 for allowing a user or operator of the user interface to select a control value for a particular color within the static range 11, 21 of the user interaction element associated with that particular color.

As shown in FIGS. 1A and 1B, the dynamic range 12 for the blue color is a subset of the static range 11 for the blue color, meaning that the amount of photon in the blue wavelength range that can be validly implemented by the multichannel lighting unit is limited and does not span the entire range that the multichannel lighting unit could possibly generate by design. For example, if the green color in the user interface is selected to be non-zero, the white channel in the multichannel lighting unit will be controlled to emit white light comprising the requested amount of green photons. This white light will however also emit a non-zero amount of blue photons, meaning that a color setting with no blue photons is not a valid setting. The green color setting therefore determines the lower limit of the valid blue range. As another example, when setting the green control value to maximum, the white channel in the multichannel lighting unit will be controlled to emit a maximum amount of white light therewith providing a maximum amount of green photons. Driving the white channel to its maximum value may cause the multichannel lighting unit to have insufficient remaining power to also drive the blue channel to its maximum value. The green color setting therefore determines the upper limit of the valid blue range. When comparing FIGS. 1A and 1B, the dynamic range 12 of user interaction element 10 associated with the blue color is adapted when selector 23 of user interaction element 20 associated with the green color is changed to a new control value. The selector 13 of user interaction element 10 may now fall outside the range of valid/executable control values for that user interaction element.

An important aspect of the described user interface is that the user or operator of user interface controls colors, which have a meaning within the context of application or use case, e.g. in the context of horticulture, instead of controlling channels of a multichannel lighting units, which for an operator is merely a technical vehicle for generating light of a particular color and intensity. The user interface is therefore more intuitive and closer to the way of thinking of the operator. The user interface is independent from the technical implementation of light sources and lighting systems.

Figure 2:
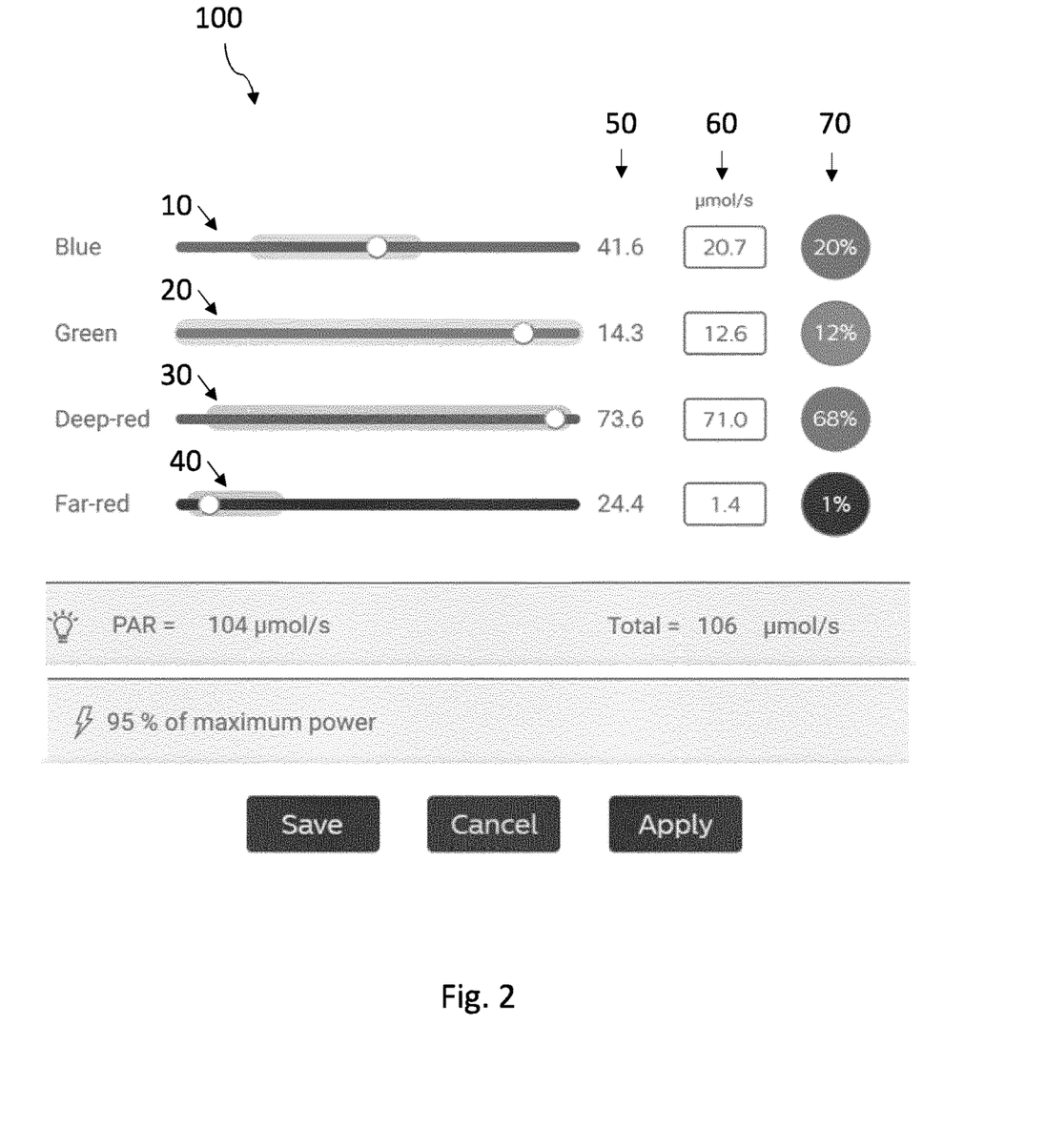
FIG. 2 schematically depicts a user interface comprising four user interaction elements with corresponding feedback indicators and showing a valid/executable light setting.

FIG. 2 schematically depicts a user interface comprising four user interaction elements for four different colors with a corresponding feedback indicator and showing a valid/executable light setting. FIG. 2 in more detail comprising a user interaction element 10 for setting a control value for a blue color, a user interaction element 20 for setting a control value for a green color, a user interaction element 30 for setting a control value for a deep-red color and a user interaction element 40 for setting a control value for a far-red color, The features of the user interaction elements are explained above in relation to FIGS. 1A and 1B. FIG. 2 further comprises an indication 50 of the maximum control value for each color in units of $\mu mol \cdot s^{-1}$. These maximum control values are the maxima of the static scale, i.e. the intrinsically maximum achievable amount of light output in that particular color by the lighting system. The term 'intrinsically' can also be understood as 'by design'. Feedback indicators 60 show the present control value as set by the user/operator for each of the user interaction elements in units of $\mu mol \cdot s^{-1}$. Ratio's 70 indicate the relative amount of light output of a particular color in the total light output as set by the user/operator. The user interface as depicted in FIG. 2 may also comprise an indication of the present total amount of PAR illumination in $\mu mol \cdot s^{-1}$ set by the user/operator, wherein PAR includes blue, green and deep-red but not far-red. The user interface may also comprise an indication the amount of power used by the present setting versus the maximum (electrical) power that the driver(s) of the multichannel lighting unit(s) can deliver. In FIG. 2, the settings for the four colors are valid settings, i.e. settings of a control value within the dynamic range of the corresponding color.

Figure 3:
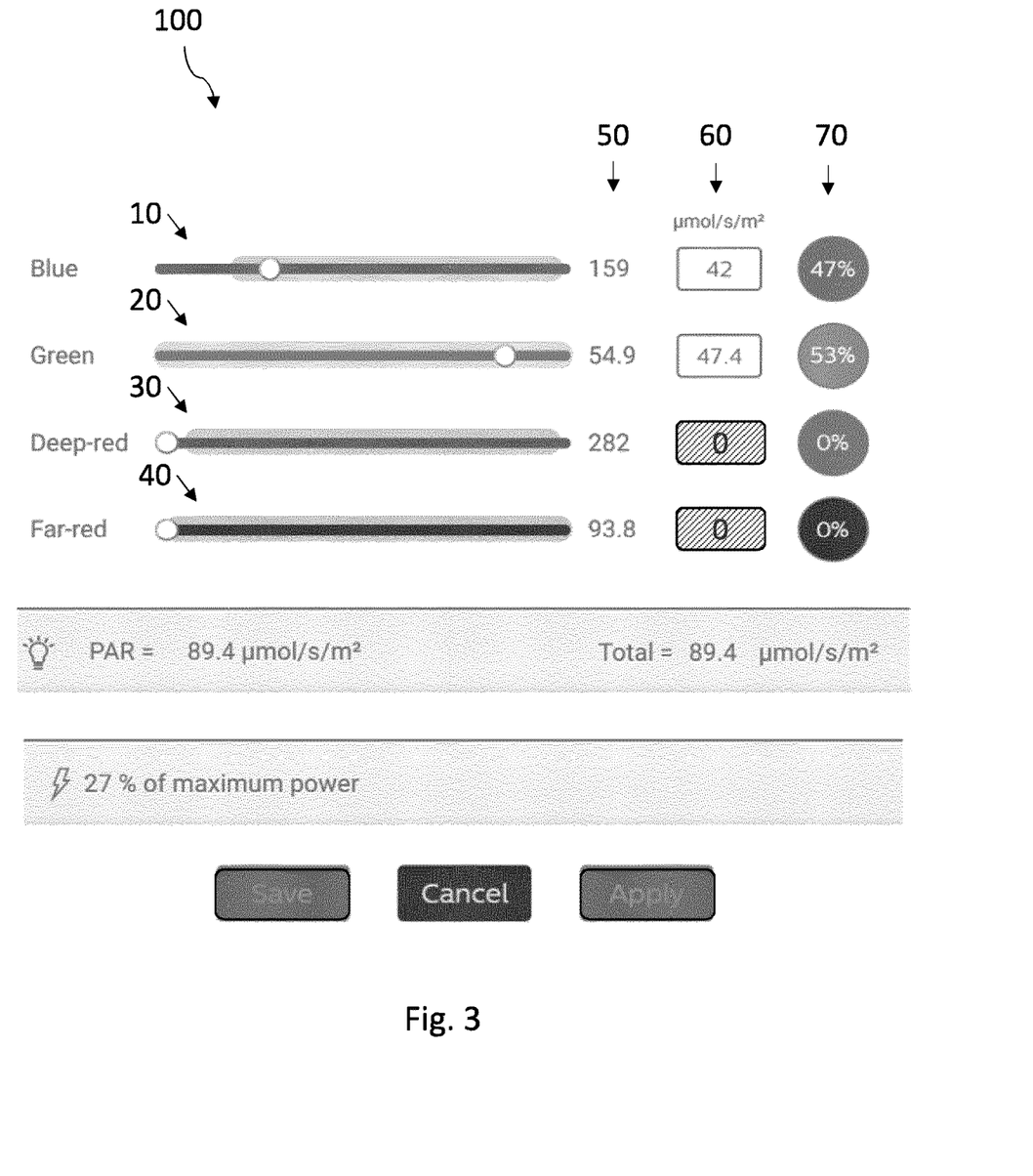
FIG. 3 schematically depicts a user interface comprising four user interaction elements with corresponding feedback indicators and showing a invalid/non-executable light setting.

FIG. 3 schematically depicts a user interface comprising four user interaction elements with corresponding feedback indicators and showing an invalid/non-executable light setting. In FIG. 3, only the blue and green color value settings are valid settings. For one or more reasons, the setting of the control values for deep-red and red is not valid, i.e. not within the dynamic range of the respective color and therefore not executable by the multichannel lighting unit, as indicated by the shaded feedback indicator 60 for deep-red and far-red. One of these reason may be that the requested amount of green light (i.e. 47.4 $\mu mol \cdot s^{-1} \cdot m^{-2}$), to be generated by the white channel in the multichannel lighting unit, may imply a small amount of deep-red and far-red emitted by the white LEDs in the white channel of the multichannel lighting unit. Values of 0 $\mu mol \cdot s^{-1} \cdot m^{-2}$ deep-red and 0 $\mu mol \cdot s^{-1} \cdot m^{-2}$ far-red are therefore not executable. As indicated below on the user interface, the invalid setting cannot be saved or applied as the button "Save" and "Apply" are dimmed. In order to set a valid combination of colors, the user or operator of the user interface needs to select a valid deep-red and far-red control value or needs to readjust the other colors until the requested amount of deep-red and far-red become feasible. A useful feature of the user interface may be that invalid setting(s) are not automatically mapped to their nearest valid setting(s) e.g. the lower limit of the dynamic range or the upper limit of the dynamic range. It may be important for a user or operator to be explicitly informed of the invalid combination and take well-considered action.

Figure 4:
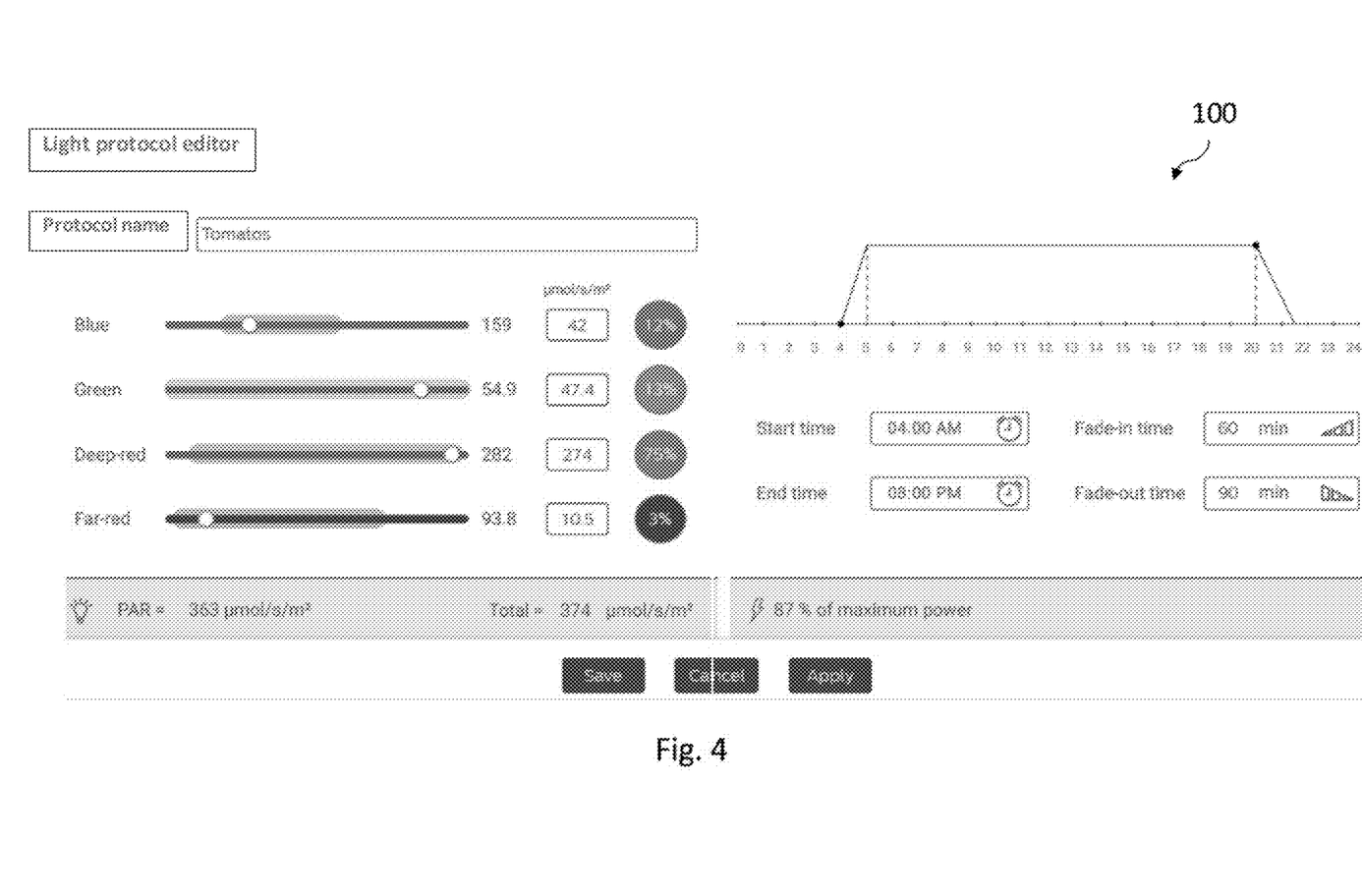
FIG. 4 schematically depicts a light protocol editor including the user interaction elements described herein.

FIG. 4 schematically depicts a light protocol editor including the user interaction elements described herein. As depicted in FIG. 4, which includes aspects as disclosed above, the light protocol editor further includes a 24-hour time line and start time, end time, fade-in time and fade-out time. The protocol editor allows a user/operator to define a 24-hour light pattern to be executed by the multichannel lighting unit or lighting system. The start time indicated the start of the 24-hour cycle; the fade-in time indicated the ramp-up of the light output from zero to the light output as set by the user interaction elements; the fade-out time indicated the dim-down of the light output from a light output value as set by the user interaction elements to zero; and the end-time indicated the end of the light emission.

Although FIG. 4 illustrated only a single cycle within a 24 hour time frame and only a single light output setting for the cycle, the skilled person will understand that multiple cycles per 24-hours and/or multiple light output settings within one cycle can be easily defined with a slightly amended user interface.

Figure 5:
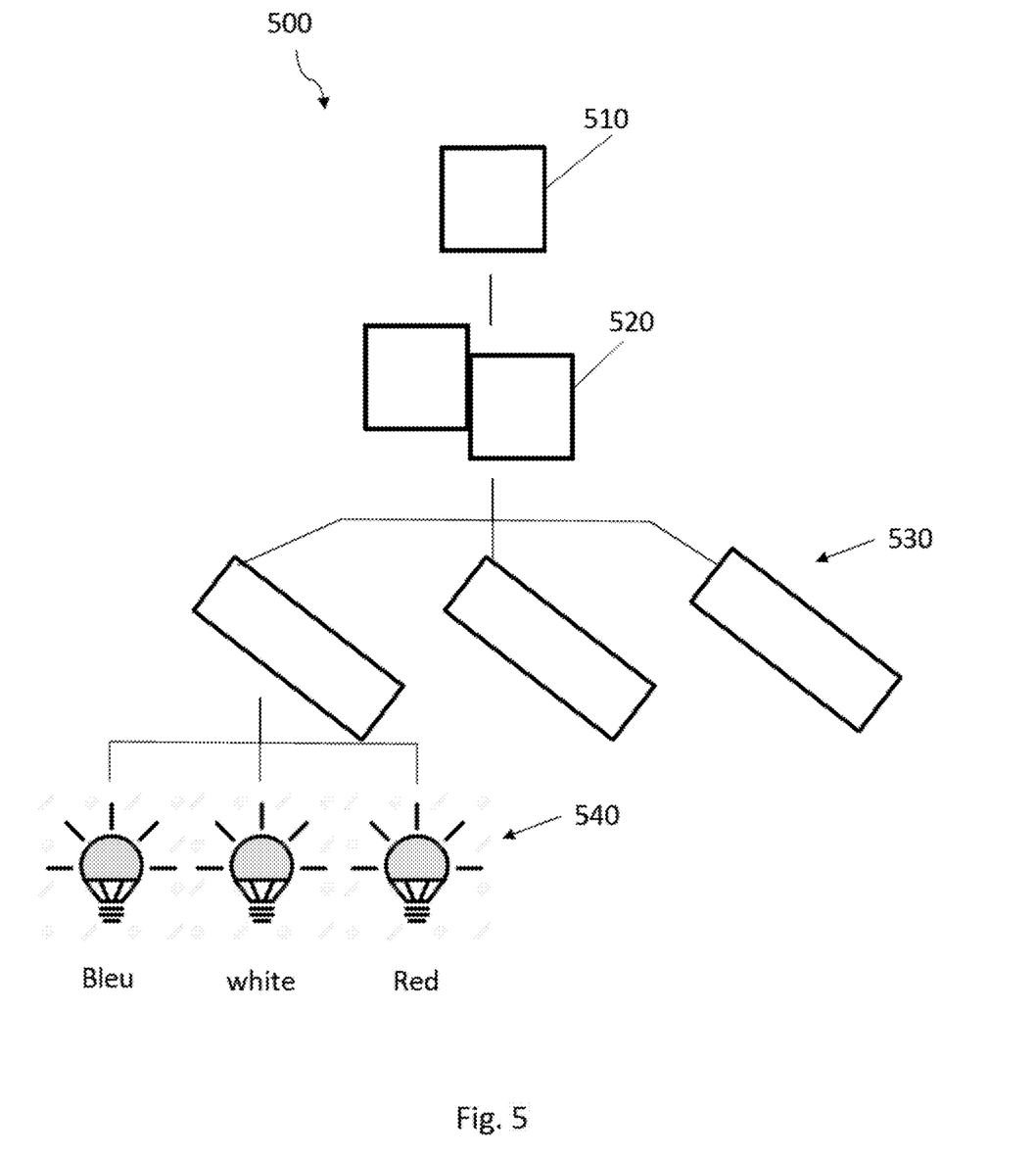
FIG. 5 schematically depicts a lighting system as described herein.

FIG. 5 schematically depicts a lighting system 500. The lighting system 500 comprises a user interface device 510, such as a computer, a laptop, a tablet, a smartphone etc. adapted to present a user interface as described above on a display and receive input from user/operator for setting light output values for different colors in the light to be emitted by the lighting system, defining light protocols etc. The user interface device is operatively coupled to one or more controllers 520, each for controlling one or more multichannel lighting units 530, wherein each channel comprising at least one light source 540 for emitting light having a channel-specific spectral composition, the spectral composition associated with one channel being different from the spectral composition associated with another channel. The light output per channel is individually controllable. In an illustrative example, the multichannel lighting unit comprises a blue channel, a white channel (emitting blue, green and red) and a red channel (emitting deep-red and some far-red). The user interface device 510, the one or more controllers 520 and the one or more multichannel lighting units 530 may be operatively connected using one or more communication networks as known in the art, such as Zigbee networks, DMX networks, WiFi networks, etc. These networks may enable bidirectional communication such that the multichannel lighting units and/or the controller can provide feedback to the user interface device regarding valid/executable settings. The user interface device may also itself comprise, for example in memory of the user interface device or in memory operatively linked to the user interface device, information about the multichannel lighting unit's capabilities in terms of valid/executable light settings.

The term "plurality" refers to two or more.

The terms "substantially" or "essentially" herein, and similar terms, will be understood by the person skilled in the art. The terms "substantially" or "essentially" may also include embodiments with "entirely", "completely", "all", etc. Hence, in embodiments the adjective substantially or essentially may also be removed. Where applicable, the term "substantially" or the term "essentially" may also relate to 90% or higher, such as 95% or higher, especially 99% or higher, even more especially 99.5% or higher, including 100%.

The term "comprise" includes also embodiments wherein the term "comprises" means "consists of".

The term "and/or" especially relates to one or more of the items mentioned before and after "and/or". For instance, a phrase "item 1 and/or item 2" and similar phrases may relate to one or more of item 1 and item 2. The term "comprising" may in an embodiment refer to "consisting of" but may in another embodiment also refer to "containing at least the defined species and optionally one or more other species".

Furthermore, the terms first, second, third and the like in the description and in the claims, are used for distinguishing between similar elements and not necessarily for describing a sequential or chronological order. It is to be understood that the terms so used are interchangeable under appropriate circumstances and that the embodiments of the invention described herein are capable of operation in other sequences than described or illustrated herein.

The devices, apparatus, or systems may herein amongst others be described during operation. As will be clear to the person skilled in the art, the invention is not limited to methods of operation, or devices, apparatus, or systems in operation.

It should be noted that the above-mentioned embodiments illustrate rather than limit the invention, and that those skilled in the art will be able to design many alternative embodiments without departing from the scope of the appended claims.

In the claims, any reference signs placed between parentheses shall not be construed as limiting the claim.

Use of the verb "to comprise" and its conjugations does not exclude the presence of elements or steps other than those stated in a claim. Unless the context clearly requires otherwise, throughout the description and the claims, the words "comprise", "comprising", and the like are to be construed in an inclusive sense as opposed to an exclusive or exhaustive sense; that is to say, in the sense of "including, but not limited to".

The article "a" or "an" preceding an element does not exclude the presence of a plurality of such elements.

The invention may be implemented by means of hardware comprising several distinct elements, and by means of a suitably programmed computer. In a device claim, or an apparatus claim, or a system claim, enumerating several means, several of these means may be embodied by one and the same item of hardware. The mere fact that certain measures are recited in mutually different dependent claims does not indicate that a combination of these measures cannot be used to advantage.

The invention also provides a control system that may control the device, apparatus, or system, or that may execute the herein described method or process. Yet further, the invention also provides a computer program product, when running on a computer which is functionally coupled to or comprised by the device, apparatus, or system, controls one or more controllable elements of such device, apparatus, or system.

The invention further applies to a device, apparatus, or system comprising one or more of the characterizing features described in the description and/or shown in the attached drawings. The invention further pertains to a method or process comprising one or more of the characterizing features described in the description and/or shown in the attached drawings.

The concepts disclosed herein can also be used in greenhouses or vertical farms (also known as plant factories) comprising a central control system for controlling environmental conditions such as temperature and $CO_2$, lighting conditions such spectrum and intensity, nutrient supply etc. for growing crops or plants.

The lighting conditions for plant growth are described in a so-called light recipe: the recipe describes the amount of light and the spectral composition of the light offered to the plants as a function of time (time of day and growth stage). A light recipe is specific for a plant type and/or plant variety (e.g. crop-type=lettuce, crop-variety=Lollo Bionda). Typically, the light recipe is executed on a central control system in the greenhouse or vertical farm (hereafter called CCS). This CCS governs almost all the control tasks that need to be fulfilled (lighting, climate, opening and closing of windows and screens, irrigation, fertilizer dosing, etc.).

Until very recently, control of LED modules in greenhouses and vertical farms was limited to switching them on or off. Multichannel lighting units as disclosed herein enable many new lighting control possibilities. However, with their introduction, complexity is added as well. These new multichannel lighting units must be commissioned, calibrated, maintained, etc. To this end, dedicated lighting control systems (LCS) have been developed so that not all CCS manufacturers/vendors have to deal with this complexity. The light output from these multichannel lighting units can be controlled by a software application or control program executed on this LCS (or in the cloud and connected to the LCS).

In general, growers only want a single user interface to control all aspects of the greenhouse or vertical farm, including the lighting. Therefore, most likely, also for the multichannel lighting units described herein (also referred to as dynamically addressable LED lighting), the user interface will be integrated in the central control application on the CCS and the CCS will instruct the LCS to render a certain requested light setting (i.e. the LCS acts as a slave).

Figure 6:
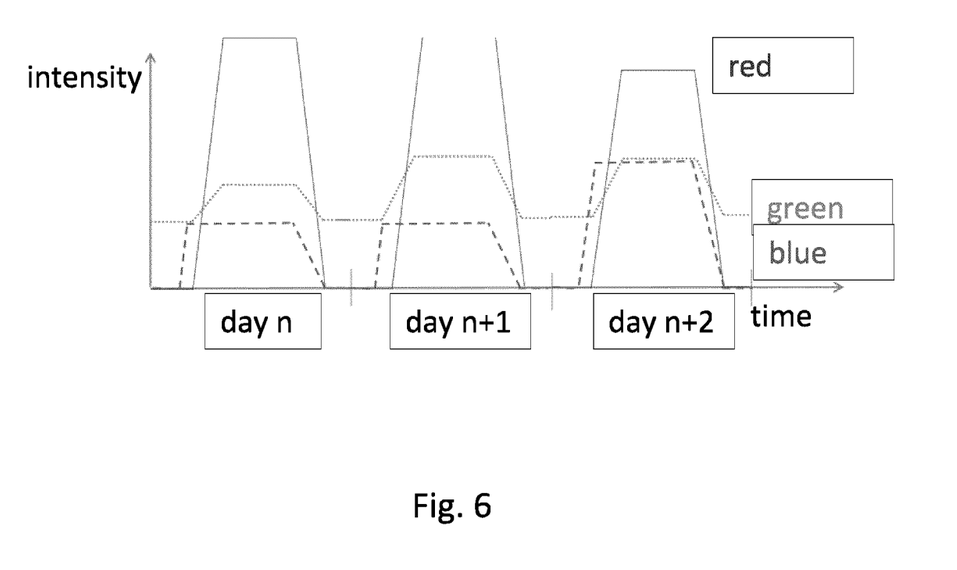
FIG. 6 schematically depicts a light recipe for a horticulture use case.

The central control computer (CCS) may execute a light recipe as for example depicted in FIG. 6. According to this recipe a certain light setting (light level or intensity and spectrum) is required at a given time. A de-facto standard in the horticulture world is to express a light setting in terms of the required photon flux (in units of micromole/m2/s) in wavelength bands of 100 nm wide such as from 400-500 nm (the blue channel), from 500-600 nm (the green channel), from 600-700 nm (the red channel), and from 700-800 nm (the far-red channel). See also FIG. 7A. In the LCS, this requested light setting is translated into a driver signal for each channel of the multichannel lighting unit (e.g. channel 1 at 50%, channel 2 at 15%, etc.). Typically, the emission spectra of different channels differ and may overlap (see FIG. 7B).

As the request of a certain light setting is made by the CCS and the translation of this setting into driver signals for the channels of the multichannel lighting unit is performed by the LCS, a problem may arise in that the CCS can ask a light setting from the LCS that cannot be realized or is not executable. More specifically, there may be a mismatch between the color specified in the light recipe and the actual, available color channels available in the lighting infrastructure.

This problem is solved by a method of communication between the CCS and the LCS which allows the exchange of information in respect of achievable light settings by the LCS. The LCS has knowledge about the capabilities of connected lighting units and can check whether a requested setting from the CCS is feasible, by considering lighting unit specifications such as light output and spectral information per channel, max. power per channel, max. total allowed power by the driver, calibration factors, and number of lighting units per square meter. The LCS communicates back to the CCS whether a requested light setting is possible, and if not, what is a best match, in addition to other information such as for example power consumption of the light setting.

Figure 7A:
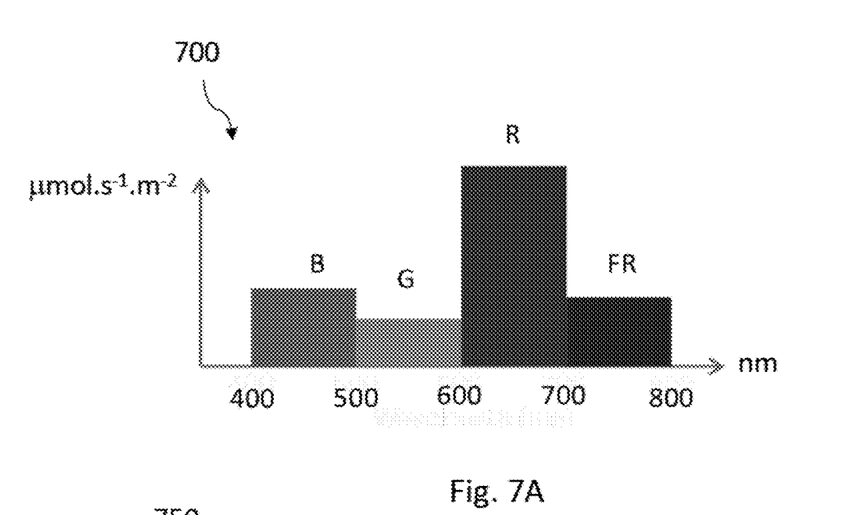
FIG. 7A schematically depicts the different colors used to define a light setting in for example a horticulture application and FIG. 7B schematically depicts the channel-specific spectrum available from a multichannel lighting unit used in the horticulture application.
Figure 7B:
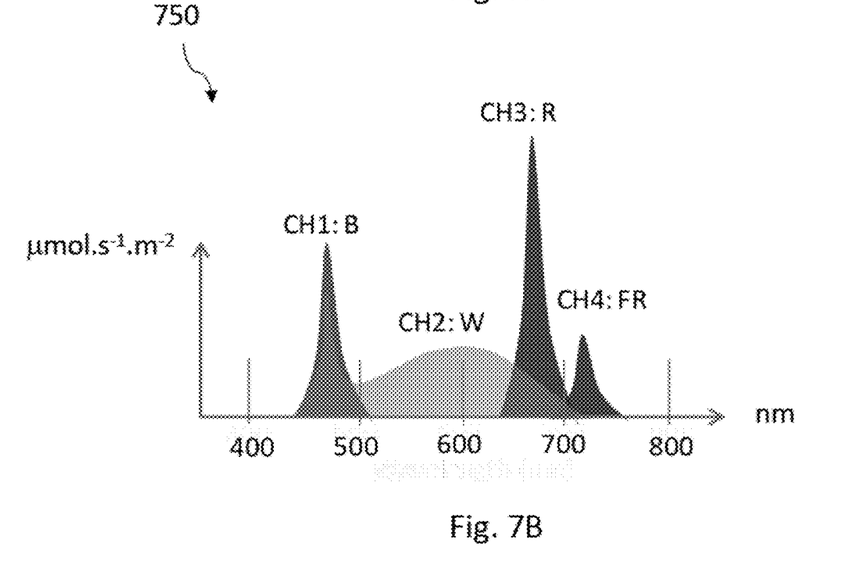

Consider for example the following use case wherein a color space for specifying a light recipe is based on the colors as shown in schematic 700 of FIG. 7A. A light setting is defined by a control value in units of $\mu mol \cdot s^{-1} \cdot m^{-2}$ for each color B, G, R, and FR. Alternatively, the light setting is based on a combination hereof (e.g. on a requested amount of photosynthetically active radiation (PAR), in combination with a requested R, G, B, and FR expressed as a percentage of PAR). From within the user interface of the central control application running on the CCS, the grower defines or chooses a light recipe from a selection of light recipes. Based on the information in this recipe, the CCS requests from the lighting control system (LCS) a certain light setting in terms of color control values. The LCS (or rather an application running on this LCS) translates this light setting in drive signals per channel of the lighting units. An exact translation is often not possible. Suppose the request is to have only green light produced. For the example shown in schematic 750 of FIG. 7B, green light can only be produced by the white channel of the lighting unit. Next to green, this channel however will also produce unwanted blue and red light. It may also be possible that more light is requested for a certain color than can be realized without exceeding the maximum light output of an lighting unit channel or without exceeding the maximum power the lighting unit driver(s) can deliver. In such cases an algorithm may be used to determine the best possible match between the requested color setting and a feasible lighting unit setting. The LCS communicates to the CCS the best possible match (in terms of color control values). Based on this, the CCS decides whether or not to accept this best match or propose another setting.

Alternative to the LCS checking a color setting received from the CCS, the CCS may request from the LCS information on the capabilities of the lighting system (for the section of the greenhouse or vertical farm in which the light recipe will be executed). The information may include:
  name of each lighting unit channel;
  spectral composition of each lighting unit channel;
  maximum allowed power consumption per lighting unit channel;
  maximum total power the lighting unit driver(s) can deliver;
  maximum light output per lighting unit channel (in µmol/s);
  number of lighting units per m2; a
  a calibration factor relating the lighting unit output ($\mu mol \cdot s^{-1} \cdot m^{-2}$) to the light level as perceived by the plants (also in $\mu mol \cdot s^{-1} \cdot m^{-2}$).

Based on this information, the CCS can translate a requested light setting per color into a setting per channel of the multichannel lighting units (either $mmol \cdot s^{-1}$ or in % of a maximum output or a value from 0-255 in case of 8 bit addressing) and convey this lighting unit setting to the LCS.

As a further alternative, the central control system (CCS) queries a light recipe database based on the available channels in the multichannel lighting units queried from the target grow lighting infrastructure (LCS), such that a light recipe can be retrieved which best describes the desired light output in the available channels. In this way, assuming availability of a matching light recipe, translating the light recipe into lighting unit channel driver signals can be relatively straight-forward. The light recipe database may be available on a local server, in the cloud or from the lighting infrastructure manufacturer/vendor.

The CCS and the LCS may communicate which each other via appropriate communication or network interfaces and API's known in the art. Such communication may be wired or wireless. The CCS and LCS may also be connected to a cloud environment. Such cloud environment may host databases comprising light recipes for growing certain crops/varieties, in some examples also specifying compatible lighting infrastructures.

In an embodiment, the user interface as described herein may be embodied in a central control application (e.g. a software program) running on the CCS of the greenhouse or vertical farm and used to control the lighting infrastructure of the greenhouse or vertical farm, or a part of the greenhouse of vertical farm where the light settings are used, e.g. areas where the same type of crop/variety is grown or zones where the lighting infrastructure is the same.

The various aspects discussed in this patent can be combined in order to provide additional advantages. Further, the person skilled in the art will understand that embodiments can be combined, and that also more than two embodiments can be combined. Furthermore, some of the features can form the basis for one or more divisional applications.

The invention claimed is:

1. A user interface for controlling a multichannel lighting unit wherein each channel of the multichannel lighting unit comprises at least one light source for emitting light having a channel-specific spectral composition, the spectral composition associated with one channel being different from the spectral composition associated with another channel, a light output from each channel being individually controllable, the user interface comprising:
    at least two user interaction elements, each user interaction element associated with a color producible with the multichannel lighting unit, wherein the color associated with at least one of the at least two user interaction elements does not have a directly corresponding channel in the multichannel lighting unit, each user interaction element comprising:
        a static scale representing a static range of control values for controlling a light output of the multichannel lighting unit in respect of the color associated with the user interaction element, wherein the range of control values in the static scale is determined by a minimum and maximum light output, in the associated color, of the multichannel lighting unit,
        a dynamic scale representing a dynamic range of control values for controlling a light output of the multichannel lighting unit in respect of the color associated with the user interaction element, wherein the dynamic range of control values is a valid/executable range determined at least in part based on a present control value selected in respect of another user interaction element, and wherein the dynamic scale is depicted as a subrange of the static scale and overlaying said static scale,
        a selector adjustable by a user of the user interface for selecting a present control value for controlling the light output of the multichannel lighting unit in respect of the color associated with the user interaction element.

2. The user interface of claim 1 wherein the dynamic range of a first of the at least two user interaction elements is automatically adapted when the present control value for a second of the at least two user interaction elements is changed using the selector of the second of the at least two user interaction elements.

3. The user interface claim 1 wherein the dynamic range of the first of the at least two user interaction elements is a subrange of the static range of the first of the at least two user interaction elements.

4. The user interface of claim 3, wherein the dynamic range excludes the end points of the static range, especially wherein a minimum control value of the dynamic range of a user interaction element is larger than a minimum control value of the static range for the user interaction element.

5. The user interface according to claim 1 wherein the selector overlays the dynamic scale, which itself overlays the static scale.

6. The user interface according to claim 1 wherein each user interaction element further comprises a feedback indicator for indicating the present control value for controlling the light output of the multichannel lighting unit in respect of the color associated with the user interaction element.

7. The user interface according to claim 1 wherein the colors associated with the at least two user interaction elements comprise one of blue, green, white, deep-red and far-red.

8. The user interface according to claim 1 wherein the control values in the static range and/or the dynamic range are expressed as a percentage or an absolute value.

9. The user interface according to claim 8 wherein the control values are expressed in $\mu mol \cdot s^{-1}$ or $\mu mol \cdot s^{-1} \cdot m^{-2}$ of photon in the wavelength range of the corresponding color.

10. The user interface according to claim 1, wherein the user interface is implemented as an application adapted to run on a central control system of a greenhouse or vertical farm.

11. A lighting system comprising:
    a multichannel lighting unit wherein each channel of the multichannel lighting unit comprises at least one light source for emitting light having a channel-specific spectral composition, the spectral composition associated with one channel being different from the spectral composition associated with another channel, and a light output from each channel being individually controllable;
    a controller for controlling the light output of each channel of the multichannel lighting unit, based on a control value in respect of the color associated with the first user interaction element;
    a user interface device adapted to present a user interface as claimed in claim 1 for selecting the control value; and
    a communication network for functionally connecting the user interface, the controller and the multichannel lighting unit.

12. The lighting system of claim 11 wherein the multichannel lighting unit comprise at least three channels: a first channel for emitting blue light, a second channel for emitting white light and third channel for emitting red, deep-red light or far-red light.

13. A method of controlling a multichannel lighting unit wherein each channel of the multichannel lighting unit comprises at least one light source for emitting light having a channel-specific spectral composition, the spectral composition associated with one channel being different from the spectral composition associated with another channel, a light output from each channel being individually controllable, the method comprising:
    providing at least two user interaction elements, each user interaction element associated with a color producible with the multichannel lighting, wherein the color associated with at least one of the at least two user interaction elements does not have a directly corresponding channel in the multichannel lighting unit, each user interaction element comprising:
- a static scale representing a static range of control values for controlling a light output of the multichannel lighting unit in respect of the color associated with the user interaction element, wherein the range of control values in the static scale is determined by a minimum and maximum light output, in the associated color, of the multichannel lighting unit,
- a dynamic scale representing a dynamic range of control values for controlling a light output of the multichannel lighting unit in respect of the color associated with the user interaction element, wherein the dynamic range of control values is a valid/executable range determined at least in part based on a present control value selected in respect of another user interaction element, and wherein the dynamic scale is depicted as a subrange of the static scale and overlaying said static scale,
- a selector adjustable by a user of the user interface for selecting a present control value for controlling the light output of the multichannel lighting unit in respect of the color associated with the user interaction element;

selecting, using the selector of a first of the at least two user interaction elements, a present control value for the color associated with the first user interaction element;

adapting the dynamic scale of a second of the at least two user interaction elements, based on the present control value selected in respect of the first user interaction element; and controlling the light output of each channel of the multichannel lighting unit, based on a control value in respect of the color associated with the first user interaction element.

14. The method of claim 13 wherein the step of adapting comprises adapting the dynamic range of the second of the at least two user interaction elements to be a subset of the static range of the second of the at least two user interaction elements, wherein a minimum control value of the dynamic range is larger than the minimum control value of the static range for the second of the at least two user interaction elements.

15. A non-transitory computer program product, when running on a processor which is functionally coupled to or comprised by the user interface as claimed, is capable of executing the steps of the method of claim 13.

* * * * *